(12) United States Patent
Matsuda et al.

(10) Patent No.: US 7,079,165 B2
(45) Date of Patent: Jul. 18, 2006

(54) DISPLAY APPARATUS AND CONTROL CIRCUIT THEREOF

(75) Inventors: Seiji Matsuda, Gifu (JP); Mitsugu Kobayashi, Nagoya (JP)

(73) Assignee: Sanyo Electric Co., Ltd., Osaka (JP)

( * ) Notice: Subject to any disclaimer, the term of this patent is extended or adjusted under 35 U.S.C. 154(b) by 386 days.

(21) Appl. No.: 10/156,745

(22) Filed: May 28, 2002

(65) Prior Publication Data

US 2002/0180745 A1 Dec. 5, 2002

(30) Foreign Application Priority Data

May 29, 2001 (JP) ............................. 2001-160996
May 29, 2001 (JP) ............................. 2001-161022

(51) Int. Cl.
*G09G 5/02* (2006.01)
(52) U.S. Cl. ...................................... 345/698; 345/547
(58) Field of Classification Search ................. 345/3.3, 345/3.4, 88, 547, 696, 698, 699
See application file for complete search history.

(56) References Cited

U.S. PATENT DOCUMENTS

| | | | | |
|---|---|---|---|---|
| 5,534,892 A | * | 7/1996 | Tagawa | ........................ 345/173 |
| 5,793,923 A | * | 8/1998 | Sawanobori | ................. 386/46 |
| 5,838,381 A | * | 11/1998 | Kasahara et al. | ........... 348/458 |
| 6,014,126 A | * | 1/2000 | Nishihara | .................... 345/698 |
| 6,188,383 B1 | | 2/2001 | Tamura | |
| 6,198,467 B1 | | 3/2001 | Chiang | |
| 6,219,017 B1 | * | 4/2001 | Shimada et al. | .............. 345/88 |
| 6,486,859 B1 | * | 11/2002 | Croll et al. | ................... 345/72 |
| 6,501,509 B1 | | 12/2002 | Han | |
| 6,509,930 B1 | * | 1/2003 | Hirano et al. | ............... 348/452 |
| 6,522,339 B1 | * | 2/2003 | Orimo | ........................ 345/606 |
| 6,704,463 B1 | | 3/2004 | Okada et al. | |
| 6,781,586 B1 | | 8/2004 | Ohta | |

FOREIGN PATENT DOCUMENTS

| | | |
|---|---|---|
| JP | 7-168542 | 7/1995 |
| JP | 9-034411 | 2/1997 |
| JP | 10-319898 | 12/1998 |
| JP | 11-316568 | 11/1999 |
| JP | 2000-207391 | 7/2000 |
| JP | 2001-134753 | 5/2001 |
| KR | 1999-027921 | 4/1999 |
| KR | 2000-0051198 | 8/2000 |

* cited by examiner

*Primary Examiner*—Richard Hjerpe
*Assistant Examiner*—Jean Lesperance
(74) *Attorney, Agent, or Firm*—Hogan & Hartson LLP

(57) ABSTRACT

Data output from a DSP (2) is subjected to pixel number adjustment and temporarily stored in a memory (6). Here, two adjacent pieces of video data are weighted in accordance with a difference between the data input and the display sampling cycle, so as to create new data. Even when video data and a display (9) have a different number of pixels, it is possible to minimize deterioration of the video data image when displayed.

6 Claims, 4 Drawing Sheets (a)

(b)

DISPLAY APPARATUS AND CONTROL CIRCUIT THEREOF

BACKGROUND OF THE INVENTION

1. Field of the Invention

The present invention relates to a digital input display apparatus into which digital video data is input, and more particularly relates to a display apparatus in which sampling is performed with a cycle different from that of the digital data input.

2. Description of the Related Art

With the rapid spread of digital pickup apparatuses (=image sensors) such as digital still cameras (DSC) and digital video cameras (DVC), small-size liquid crystal displays (LCD) have become commonly used as displays for such cameras, for which small sized displays capable of displaying very fine video images are desired.

FIG. 6 is a block diagram showing a structure of a typical conventional digital pickup apparatus comprising a pickup block 1, a digital signal processor (hereinafter, referred to as DSP) 2, a storage medium 3, a frame memory 4, an encoder 101, a digital-to-analog (hereinafter, referred to as D/A) converter 102, an analog signal processor (hereinafter, referred to as ASP) 103, and a display 9. The pickup block 1 includes, for example, a charge couple device (hereinafter, referred to as CCD) inside and outputs digital video data corresponding to a scenery received by the CCD. The DSP 2 performs predetermined processing such as gamma correction to a digital signal and outputs the processed digital video data to respective blocks. Moreover, the DSP 2 reads out video data from the storage medium 3 and the frame memory 4 and outputs it to the encoder 101. The storage medium 3 is, for example, a card having a built-in flash memory, a magnetic tape, or the like which stores video data that has been picked up. The frame memory 4 temporarily holds video data to be processed by the DSP (digital signal processor) 2. The encoder 101 converts the digital video data into a video format normalized by the NTSC, PAL, or the like. The D/A converter 102 converts digital data into analog data and outputs analog video data. The ASP 103 converts the video data into a voltage signal appropriate for the display 9 by again applying gamma correction to the analog video data and if the display 9 is an LCD, reversing the signal for reverse drive. The display 9 is a display apparatus such as an LCD and an EL display apparatus. For an active matrix display, the display 9 has a built-in H scanner 9a and a V scanner 9B and displays an image on a display block 9c corresponding to the video data of the pickup block 1 and the storage medium 3.

In recently introduced CCDs for DSCs and DVCs, the number of pickup pixels has rapidly increased. For example, it is now not uncommon for several millions of pixels to be arranged in matrix and pick up an image data based on a predetermined standard. However, in order to reduce the size of such a digital pickup apparatus, the number of pixels of the display 9 for displaying an image being picked up is normally about a hundred thousand. Moreover, as shown in FIG. 2A, image data picked up is usually arranged in the stripe arrangement in which colors RGB are aligned in the column direction while in the display 9, as shown in FIG. 2B, in order to display a highly fine image with a small number of pixels, the colors RGB are usually arranged in the delta arrangement, i.e., adjacent lines are offset with a predetermined pitch.

In such a case, sampling processing is required for thinning video data which is input, in accordance with the number of pixels of the display. In the conventional structure, digital video data is temporarily converted into analog data and the ASP (analog signal processor) 103 samples the analog video data at a predetermined timing in accordance with the number of pixels of the display 9.

However, a circuit handling an analog signal usually has a bipolar transistor and designing of the circuit requires a long time as compared to a digital circuit consisting of an MOS transistor. Moreover, an analog circuit consisting of the bipolar transistor consumes more power than a digital circuit consisting of the MOS transistor.

Moreover, as is clear from comparison of FIG. 2A and FIG. 2B, when displaying stripe-arranged data on a delta-arrangement display, data in lines of odd numbers may be displayed as it is but in lines of even numbers, data pixel positions are different from the display pixel positions, which makes correct display impossible.

SUMMARY OF THE INVENTION

It is therefore an object of the present invention to provide a display apparatus for us with DSC and DVC devices, wherein an ASP is not required.

It is another object of the present invention to provide a display apparatus capable of displaying stripe-arranged data on a delta-arrangement display with a preferable reproducibility.

The present invention relates to a display apparatus and a display control circuit for converting input digital video data, which is input with a first cycle (frequency) and has a first number of pixels, into output digital video data having a second number of pixels and a second cycle (frequency). The display control circuit comprises a delay circuit for delaying the input digital video data by one pixel and a pixel number adjusting circuit for weighting the input digital video data and input digital video data of two adjacent pixels obtained as an output of the delay circuit and for setting the two weights in accordance with a difference between the first and second cycles.

By thus weighting/adding the data of two pixels, it is possible to improve reproducibility of the output digital video data.

Moreover, by providing a memory for storing the input digital video data which is input by the first cycle, it is possible to synchronize a read-out timing with a timing of the display apparatus. Accordingly, it is possible to display data without providing the ASP.

DETAILED DESCRIPTION OF PREFERRED EMBODIMENTS

Figure 1:
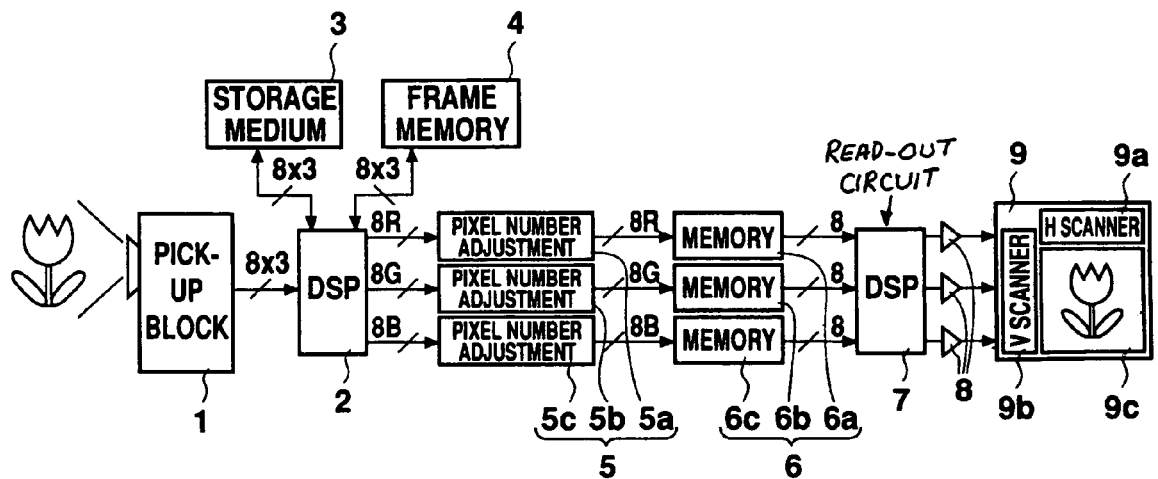
FIG. 1 is a block diagram showing the structure of a digital pickup apparatus according to an embodiment of the present invention.

FIG. 1 is a block diagram showing a digital pickup apparatus according to an embodiment of the present invention comprising a pickup block 1, a DSP 2, a storage medium 3, a frame memory 4, a pixel number adjusting circuit 5, a memory 6, a DSP 7, an amplifier 8, and a display 9.

The pickup block 1 comprises, for example, a CCD and the like and outputs digital video data corresponding to a scenery. The DSP 2 performs a predetermined processing such as gamma correction to the digital signal and outputs the processed digital video data to respective blocks. Moreover, the DSP 2 reads out digital video data from the storage medium 3 and the frame memory 4 and outputs the data to the pixel number adjusting circuit 5. The storage medium 3 may be, for example, a card having a built-in flash memory, a magnetic tape, or the like and stores picked up video data. The frame memory 4 temporarily holds digital video data to be processed by the DSP 2. As will be detailed later, the pixel number adjusting circuit 5 samples digital video data at a predetermined timing and outputs digital video data corresponding to the number of pixels of the display 9. The memory 6 is a flip-flop or a line memory which can holds 10 words of 10 8-bit data (words). The DSP 7 converts the data which has been read out from the memory 6 into video data appropriate for the display 9 by performing again gamma correction and if the display 9 is an LCD, reversing a signal for reverse drive. The DSP 7 also converts digital data into, for example, a voltage signal of 1 V and outputs the signal. That is, D-1V analog voltage obtained by D/A conversion of the 8-bit video data is output. The amplifier 8 amplifies the 1 V output from the DSP 7 to 5 V, for example, so as to be appropriate for the pixel voltage of the display 9. The display 9 is a display apparatus such as an LCD and an EL display apparatus. In case of the active matrix type, the display 9 has a built-in H scanner 9a and V scanner 9b and displays an image on a display block 9c according the video data which has been output by the DSP 2.

Figure 2:
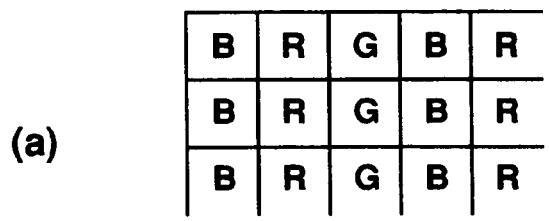
FIG. 2 shows a stripe arrangement and a delta arrangement.
Figure 2:
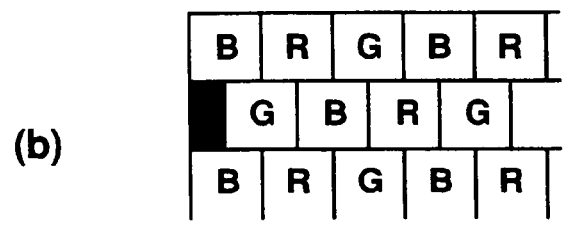

The digital video data which is output from the pickup block 1 and processed by the DSP 2 is, for example, QVGA normalized and the data has 320 pixels for each of RGB in one line. The pixels are arranged in the stripe type arrangement as shown in FIG. 2A. In the storage medium 3, data according to this standard is stored. In contrast, in the display 9, each line has 186 pixels for each of RGB, i.e., 558 pixels in total and, as shown in FIG. 2B, arranged in the delta type arrangement in which the same colors in adjacent lines are offset by 1.5 pixels. Accordingly, in order to display on the display 9 the digital video data which is output from the DSP 2, it is necessary to reduce the number of pixels of the digital video data from 320 pixels to 186 pixels, i.e., by about 3/5.

QVGA digital video data is transmitted with a frequency of 6.25 MHz and a cycle of 160 n seconds (=nano seconds). On the other hand, a 557-pixel display performs sampling with a frequency of 11.04 MHz and a cycle of 271 n seconds. Thus, when sampling is performed with the signal transmission frequency different from the sampling frequency, for example, the sampling timing may overlap a change point of the digital data, which makes normal data sampling and normal display impossible. To cope with this, in this embodiment, the pixel number adjusting circuit 5 and the memory 6 are arranged for each of the RGB colors. Hereinafter, explanation will be given on operation of these.

The pixel number adjusting circuit 5 creates 3-pixel digital data from 5-pixel digital video data and outputs the 3-pixel digital data. The memory 6 temporarily stores the video data whose pixel number has been reduced to 3/5 and data is read out with a frequency appropriate for the display 9, i.e., 11.04 MHz.

Figure 3:
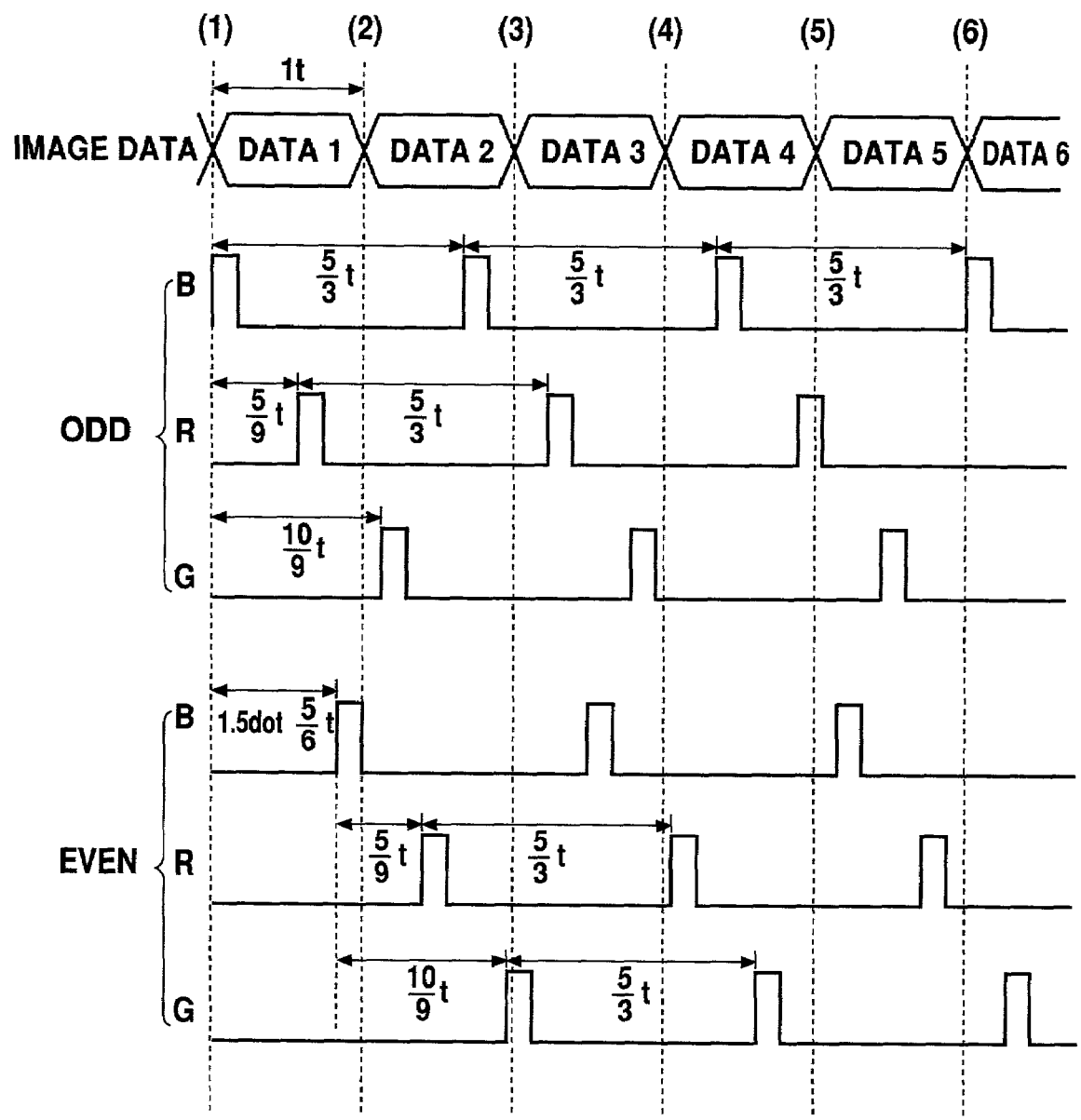
FIG. 3 shows a conceptual timing of video data and sampling.

Hereinafter, the pixel number adjusting circuit 5 will be detailed. FIG. 3 shows a conceptual timing diagram for explaining the concept for selecting video data and pixels to be sampled. The video data is input in synchronization with a data clock whose cycle is 1 t=160 n seconds. For each 1 t, 8bit data corresponding to each of the RGB colors is input to the pixel number adjusting circuits 5a, 5b, 5c. The pixel number adjusting circuit 5 creates video data for 3 pixels while 5-pixel video data is input and outputs the created data. The sampling timing of odd-number lines (ODD) is different from that of even-number lines (EVEN). In FIG. 3, the upper half shows the timing of RGB of the odd-number lines and the lower half shows the timing of RGB of the even-number lines.

A first method for data creation with a reduced number of pixels will first be explained. In this first method, the most appropriate data is selected and sampled from 5-pixel video data, thereby thinning the 5-pixel video data into 3-pixel data. First, data to be sampled is determined from the sampling timing. When the video data to be input is color B of an odd-number line, the data sampling timing is timing (1) when video data 1 is input and a first sampling is performed. Then, sampling is performed with 5 t/3 cycle. The sampling timing of the R color of an odd-number line is delayed by 1/3 of a cycle compared to the sampling timing of the B color. That is, a first sampling is performed with a delay of 5 t/3×1/3=5 t/9. After this, similarly, sampling is performed with 5 t/3 cycle. The sampling timing of the G color of an odd-number line is delayed by 2/3 of a cycle compared to the sampling timing of the B color. That is, a first sampling is performed with a delay of 5 t/3×2/3=10 t/9. After this, similarly, sampling if performed with the 5 t/3 cycle. Because the display 9 of the present embodiment has a delta arrangement, sampling timings of the respective colors of even-number lines are delayed by 1.5 pixels, i.e., 5 t/6 as compared to the sampling timings of the respective colors of the odd-number lines.

Accordingly, the data to be sampled for the respective colors of the odd-number line and the even-number line are as follows:

Odd-number line B color Data 1, 2, 4
Odd-number line R color Data 1, 3, 4
Odd-number line G color Data 2, 3, 5
Even-number line B color Data 1, 3, 5
Even-number line R color Data 2, 4, 5
Even-number line G color Data 1, 2, 4

Figure 5:
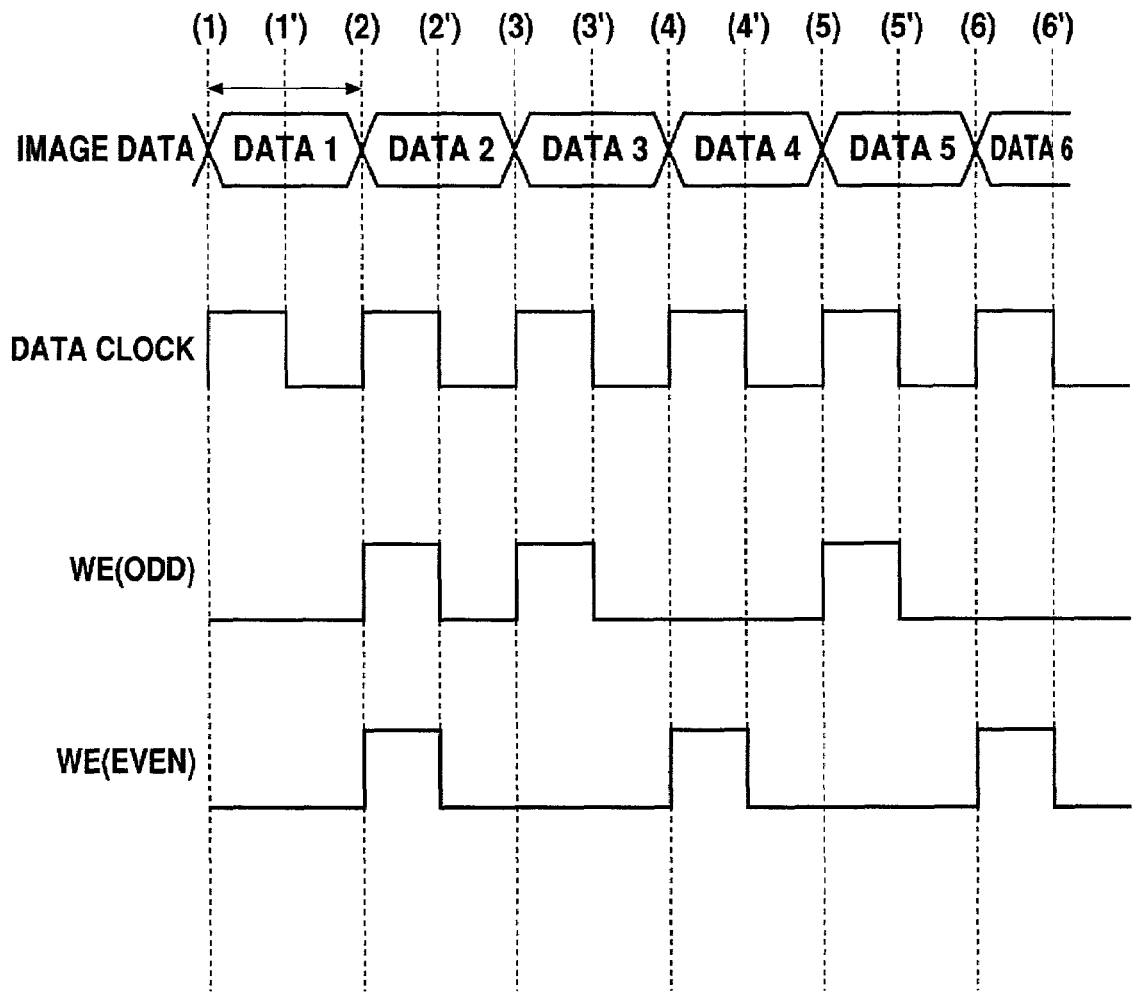
FIG. 5 is a timing chart for explaining operation of the pixel number adjusting circuit of color B according to the embodiment of the present invention.
Figure 6:
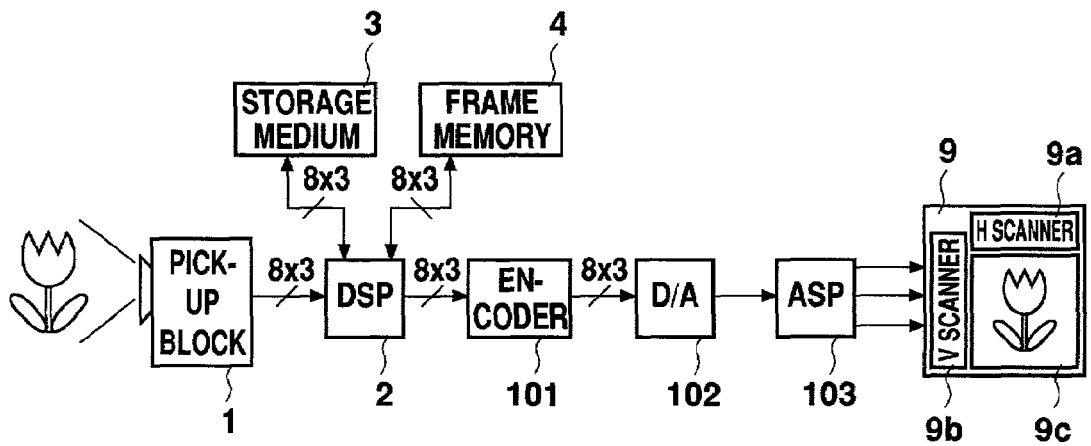
FIG. 6 is a block diagram showing structure of a conventional digital pickup apparatus.

Thus, data to be sampled is selected and sampled at a timing when the data clock is switched from High to Low and is output to the memory 6. It should be noted that, as shown in FIG. 5, the data clock is switched from High to Low at an intermediate point of each data. Three of the five fall edges of the data clock are employed and, as has been described above, three out of five data points are selected and stored in the memory 6. The display 9 successively reads data out from the memory 6 with a cycle inherent to the display 9 and displays the data. Thus, by temporarily storing data in the memory 6, sampling of the display is performed at the data change point, thereby preventing lowing of reproducibility of the display. Moreover, as has been described above, by optimizing the data selected in accordance with the sampling timing of the display 9, it is possible to suppress deterioration of the quality of the image displayed on the display 9.

In particular, when displaying stripe-arranged data on the delta arrangement type display, the display simply performs sampling from the memory 6, thereby enabling data display optimized for the delta arrangement. For example, no special operation, such as delaying the sampling timing by 1.5 pixels only in the odd-number lines, is necessary and it is possible to use a general-purpose display as the display 9.

As has been described above, when video data is simply thinned, the removed data is lost forever, and the video image is likely to deteriorate. Especially when displaying a thin longitudinal line, the image of the line may remain on some lines and disappear on the other lines, causing a so-called "jag".

Next, explanation will be given on a second method of data creation. In the second method, two video data sets are added with a predetermined ratio to create a new set of video data.

First, data creation of the B color of an odd-number line will be explained. Because the first data of the B color of the odd-number line is sampled at the same timing of data 1 of the original data, the data 1 is used as is. Next, the second data sampled after 5 t/3 is sampled after 2 t/3 when considering the timing when data 2 is input and before t/3 when considering the timing (3) when data 3 is input. Accordingly, the second data is created as a sum of data 2 and data 3 multiplied by coefficients weighted in accordance with the timing difference. The coefficients weight more heavily the data at a nearer timing. That is, the second data is created by adding data 2 multiplied by 1/3 and data 3 multiplied by 2/3. Similarly, since the third data is after t/3 from the timing (4) and before 2 t/3 from timing (5), the third data is created by adding data 4 multiplied by 2/3 and data 5 multiplied by 1/3. This can be summarized as follows. The B color data of the odd-number line creates the following three data sets from the five data, data 1 to data 5, and the three data sets are output.

Data 1
1/3 (data 2)+2/3 (data 3)
2/3 (data 4)+1/3 (data 5)

Next, the first data of the R color of the odd-number lines are delayed by 1/3 of the sampling cycle, i.e., 5 t/9 as compared to the B color of odd-number lines. Accordingly, the first data is delayed by 5 t/9 from the timing (1); the second data is delayed by 2 t/9 from the timing (2); and the third data is delayed by 8 t/9 from the timing (4). By weighting in accordance with these delay amounts, the data of the R color of the odd-number lines are calculated as follows:

4/9 (data 1)+5/9 (data 2)
7/9 (data 3)+2/9 (data 4)
1/9 (data 4)+8/9 (data 5)

Similarly, the first data of the G color of the odd-number lines are respectively delayed by 10 t/9 as compared to the B color of the odd-number lines. That is, the first data is delayed by 1 t/9 from the timing (2); the second data is delayed by 7 t/9 from the timing (3); and the third data is delayed by 4 t/9 from the timing (4). Accordingly, the data of the G color of the odd-number lines are calculated as follows to create three data sets:

8/9 (data 2)+5/9 (data 3)
2/9 (data 3)+2/9 (data 4)
5/9 (data 5)+4/9 (data 6)

The same operation is repeated for timing (6) and subsequent timings.

When the display is a stripe arrangement type, it is possible to optimize the video data appropriate to the number of pixels of the display 9 by performing the aforementioned operation for each of the lines.

When the display 9 is a delta arrangement type, data of the respective colors of the even-number lines are offset by 1.5 pixels compared to the data of the respective colors of the odd-number lines. Accordingly, the sampling timing is delayed by 1.5 pixels, i.e., 5 t/6. Data creation of the even-number lines should also be performed like the odd-number lines by calculating a difference from the timing when the original video data is input and setting another coefficient weighted in accordance with the difference. Calculation details are omitted here but calculation can be performed in the same manner as described above.

The B color data of the even-number line are created as follows:

1/6 (data 1)+5/6 (data 2)
1/2 (data 3)+1/2 (data 4)
5/6 (data 5)+1/6 (data 6)

The R color data of the even-number line are created as follows:

11/18 (data 2)+7/18 (data 3)
17/18 (data 4)+1/18 (data 5)
5/18 (data 5)+13/18 (data 6)

The G color data of the even-number line are created as follows:

1/18 (data 2)+17/18 (data 3)
7/18 (data 4)+11/18 (data 5)
14/18 (data 5)+4/18 (data 6)

Data is created in the same way for timing (6) and subsequent timings.

As has been described above, when three video data items are created from 5 video data items, optimal data for the pixel position can be created. Accordingly, when the video is displayed on the display 9 having a small number of pixels, it is possible to minimize deterioration of the image quality. It should be noted that the data write-in timing and read-out timing are identical to that in the above described case.

It should be noted that the calculation described above use values optimized for the sampling cycle. However, when multiplying the 8-bit data by the aforementioned coefficients, the circuit size is increased. Next, explanation will be given on a third method for data creation. In the third embodiment, the coefficients are adjusted to values necessary and sufficient for multiplying the 8-bit data.

The B color data of the odd-number lines are:
1.00 (data 1)+0.00 (data 2)
0.25 (data 3)+0.75 (data 4)
0.75 (data 5)+0.25 (data 6)

The R color data of the odd-number lines are:
0.50 (data 2)+0.50 (data 3)
0.75 (data 4)+0.25 (data 5)
0.25 (data 5)+0.75 (data 6)

The G color data of the odd-number lines are:
0.75 (data 2)+0.25 (data 3)
0.25 (data 4)+0.75 (data 5)
0.50 (data 5)+0.50 (data 6)

The B color data of the even-number lines are:
0.25 (data 1)+0.75 (data 2)
0.50 (data 3)+0.50 (data 4)
0.75 (data 5)+0.25 (data 6)

The R color data of the even-number lines are:
0.50 (data 2)+0.50 (data 3)
1.00 (data 4)+0.00 (data 5)
0.25 (data 5)+0.75 (data 6)

The G color data of the even-number lines are:
0.00 (data 2)+1.00 (data 3)

0.50 (data 4)+0.50 (data 5)

0.75 (data 5)+0.25 (data 6)

That is, the coefficients explained in the second method are set to the nearest among five values: 0, 0.25, 0.5, 0.75 and 1. When only four coefficients are used, although the image reproducibility is slightly lowered as compared to the second method, the digital data calculation is greatly simplified and the pixel number adjusting circuit 5 can be made very small.

Figure 4:
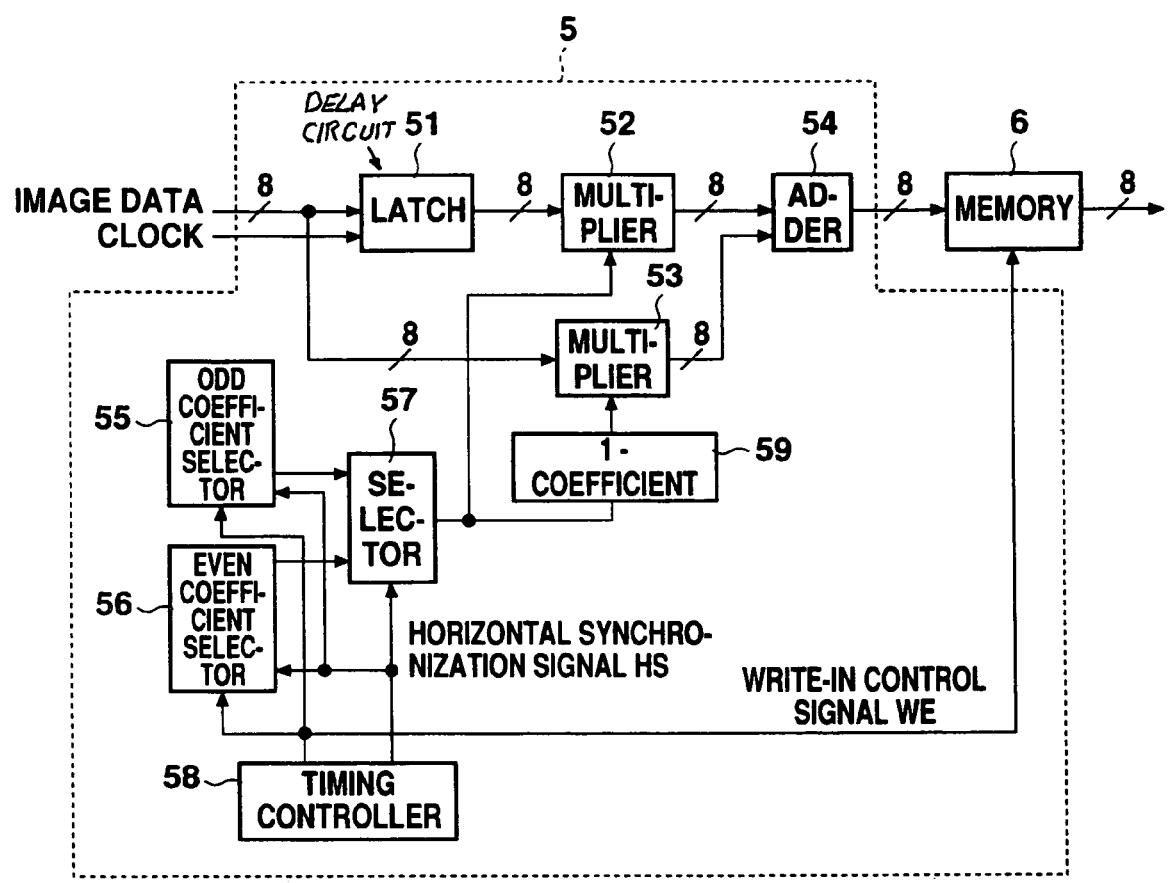
FIG. 4 is a block diagram showing a pixel number adjusting circuit according to an embodiment of the present invention.

Next, a specific example of the pixel number adjusting circuit 5 which performs the noted operation will be described. FIG. 4 is a block diagram showing an example of the pixel number adjusting circuit 5. The pixel number adjusting circuit 5 includes a latch circuit 51, multipliers 52, 53, an adder 54, coefficient selectors 55, 56, a selector 57, a timing controller 58, and a coefficient calculator 59.

The latch circuit 51 is supplied with original QVGA digital video data and a data clock and latches one pixel of the video data when the data clock is switched from High to Low. The video data latched by the latch circuit 51 is supplied to the multiplier 52 while the video data is directly supplied to the multiplier 53. The multipliers 52 and 53 respectively multiply the data by predetermined coefficients and output the results. The adder 54 calculates a sum of the two data items output from the multiplies 52 and 53 and outputs the result to the memory 6. The coefficient selectors 55 and 56 have a data table storing coefficients corresponding to the odd-number lines and the even-number lines, respectively, and select and output predetermined coefficients. The selector 57 selects one of the outputs from the coefficient selector 55 and 56 and outputs it. The timing controller 58 outputs a write-in control signal WE, a horizontal synchronization signal HS, and a vertical synchronization signal VS of a predetermined timing. The write-in control signal WE is supplied to the memory 6 and the memory 6 performs data write-in operation in accordance with the signal WE. The write-in control signal WE is fed to the coefficient selectors 55 and 56, and when the write-in control signal changes from High to Low, the coefficient selectors 55 and 56 switch to the next coefficients to be output. Moreover, the coefficient selectors 55 and 56 are also supplied with the horizontal synchronization signal HS and reset by this so as to output the first coefficient. The selector 57 is supplied with the horizontal synchronization signal HS and switches to the coefficient selector 55 or 56 in accordance with the signal HS. The coefficient calculator 59 outputs [1−coefficient selected by the selector] to the multiplier 53.

Next, operation of the pixel number adjusting circuit 5 will be explained. FIG. 5 is a timing chart for explaining operation of the pixel number adjusting circuit for the B color. The timing chart shows, from above, input data, a data clock, the write-in control signal WE of odd-number lines (ODD), and the write-in control signal WE of even-number lines (EVEN). As shown in FIG. 1, the pixel number adjusting circuit 5 is provided for each of the RGB colors, but here the pixel number adjusting circuit 5 for the B color will be explained as a representative example. For the B color, the coefficient selector 55 of the odd-number lines contains three data items (1, 1/3, 2/3) while the coefficient selector 56 of the even-number lines contains three data items (1/6, 1/2, 5/6), and the coefficient selectors 55 and 56 successively output these data while switching the data in accordance with the control signal WE. (In case of the aforementioned third method, the coefficient used is one of the aforementioned five coefficients.)

First, operation for the odd-number lines will be explained. As the initial state, the coefficient selectors 55 and 56 are reset by the horizontal synchronization signal HS and both output the first coefficients. That is, the selector 55 selects "1" while the selector 56 of the even-number lines selects "1/6". Moreover, the selector 57 is reset by the vertical synchronization signal VS and selects the selector 55 of the odd-number lines. First, a timing (1), the clock is switched from Low to High and simultaneously with this, data 1 is input. At the timing when the clock is switched from High to Low, data 1 is latched by the latch circuit 51. The data 1 latched is output to the multiplier 52 where the data 1 is multiplied by the coefficient "1" and output. Next, at the timing (2) when the clock becomes High, data 2 is input in synchronization with the clock and the write-in control signal WE becomes High. Since the coefficient calculator outputs [1−1=0], the multiplier outputs 0 data regardless of the value of data 2. The outputs of the multipliers 52 and 53 are added by the adder 54 and the first data (=data 1) is written into the memory 6.

Next, when the clock is switched to Low, data 2 is latched by the latch circuit 51. Moreover, the write-in control signal WE is switched to Low in synchronization with the clock. Through this process, the coefficients of the selectors 55 and 56 are switched from one to another and the coefficient selector 55 outputs the coefficient "1/3". Accordingly, the coefficient calculator 59 outputs "2/3". At timing (3), data 3 is input and the write-in control signal WE is switched to High. Then, the data 2 latched by the latch circuit 51 is multiplied by the coefficient 1/3 in the multiplier 52 while data 3 is multiplied by the coefficient 2/3 in the multiplier 53. The multiplication results are added in the adder 54. The sum is written as the second data into the memory 6. When the write-in control signal WE becomes Low, the coefficients of the coefficient selectors 55 and 56 are switched from one to another and the coefficient selector 55 outputs "2/3"

When the clock is switched to Low, data 3 is latched. At timing (4), the multipliers and the adder are operating but the write-in control signal WE remains Low and nothing is written into the memory 6. The clock becomes again Low and data 4 is latched by the latch circuit 51. Next, at timing (5) when the clock and the write-in control signal WE become High, the data 4 which has been latched is multiplied by the coefficient 2/3 while the data 5 fed is multiplied by the coefficient 1/3. The multiplication results are added and the sum is written into the memory 6.

When one line is completed by repeating the operation described above, the horizontal synchronization signal HS is input and operation is switched to the next line. The operation for even-number lines will next be described. The selector 57 is switched by the horizontal synchronization signal HS so as to select the coefficient selector 56 of even-number lines. The horizontal synchronization signal HS also resets the coefficient selectors 55 and 56, and the coefficient selector 56 selects and outputs "1/6".

At timing (1), data 1 is input and at timing (1'), the data 1 is latched. At timing (2), data 2 is input and the write-in control signal WE becomes High. The data 1 which has been latched is multiplied by the coefficient "1/6" and the data 2 is multiplied by the coefficient 5/6. The multiplication results are added and the sum is written into the memory 6. At timing (2'), the data 2 is latched and the coefficients of the coefficient selectors 55 and 56 are switched from one to another. The coefficient selector 56 outputs the coefficient 1/2. At timing (3), data 3 is input but the write-in control signal WE remains Low, and nothing is written into the memory 6. The timing (3'), the data 3 is latched.

At timing (4), data 4 is input and the write-in control signal WE becomes High. The data 3 which has been latched is multiplied by the coefficient 1/2 and the data 4 which has been input is multiplied by the coefficient 1/2. The multiplication results are added and the sum is written into the memory 6. At timing (4'), data 4 is latched and the coefficients of the coefficient selectors 55 and 56 are switched from one to another. The coefficient selector 56 outputs the coefficient 5/6. At timing (5), data 5 is input and at timing (5'), the data is latched. At timing (6), data 6 is input and the write-in control signal WE becomes High. The data 5 which has been latched is multiplied by the coefficient 5/6 and the data 6 which is input is multiplied by the coefficient 1/6. The multiplication results are added and the sum is written into the memory 6.

The above operation is repeated until the horizontal synchronization signal HS is input to switch the operation to the odd-number line.

The above explanation described reducing the number of pixels to 3/5. Next, this reduction will be described. Because the video signal has 320 pixels and the display has 186 pixels, the conversion ratio 3/5 is not an exact correct value. Although by performing the pixel number conversion of 186/320, it is possible to display data with a higher reproducibility, when the conversion ratio has a large denominator, the circuit size of the pixel number conversion circuit is increased. In this embodiment, the conversion ratio is based on a so-called true circle ratio, i.e., into data of the ellipse into which the video data representing a circle is converted. With the conversion ratio 3/5 of the present embodiment, the true circle ratio is not less than 99%. That is, circle distortion is 1% or below in the longitudinal-lateral ratio. When using another conversion ratio, it is preferable that the true circle ratio be 97% or above and the distortion be ±3% or less. Moreover, it is preferable to set a simple ratio with a denominator as small as possible.

Moreover, in the above example, it was assumed that the video data is QVGA and the display 9 has the sampling clock of 11.04 MHz, i.e., the NTSC standard. Accordingly, the conversion ratio is set to 3/5. For example, when the display is PAL, the sampling clock is 10.97 MHz. When displaying this video data on the aforementioned display 9, by reducing the number of pixels of the input video data to 8/13, it is possible to calculate coefficients weighted basically by the aforementioned concept for operation. Moreover, in case of the ITUR 601 standard in which the input video data is 27 MHz and the display is NTSC, the number of pixels is reduced to 6/11. In these cases, coefficients can be calculated by the same concept as has been described above. The conversion ratio is always set considering the true circle ratio, and the pixel number adjusting circuit 5 is usually formed as a semiconductor chip controlling the display, and the display assumed and the standard of the input video data can be estimated in advance. Accordingly, when a plurality of coefficient tables of all the patterns corresponding to the assumed standards are provided in the pixel number adjusting circuit 5 as a semiconductor chip and the tables to be used are switched from one to another by an external signal, the same semiconductor chip can be used for various products in accordance with the display 9 connected and the input data. This can reduce the production cost as compared to a case when a different pixel number adjusting circuit 5 is prepared for each of the products.

Of course, the present invention is effective not only for cases wherein the display 9 is the delta arrangement type, but also for cases in which the display 9 is the stripe arrangement type when the number of pixels of the image data to be displayed differs from the number of pixels of the display. With a stripe arrangement, the operation of the odd-number line is simply repeated for all the lines. Moreover, even when the number of pixels of the image data to be displayed is identical to the number of pixels of the display, the present invention is effective when displaying image data of stripe arrangement on the display of delta arrangement by offsetting the display data of even-number lines by 1.5 pixels as compared to the odd-number lines.

It should be noted that, in accordance with the operation time of the multipliers 52 and 53 and the adder 54, outputs are delayed by a predetermined time, and it is necessary to ensure that this delay will not make the write-in data unstable. For example, the rise timing of the write-in control signal WE may be delayed by the delay amount.

The memory 6 will next be described. The memory 6 may be created with the capacity to store all the data of an entire line, but this makes the circuit size quite large. The memory 6 of the present embodiment has a capacity to store 8-bit video data of 10 pixels. The memory 6 may be a line memory or 10-stage flip-flop. The memory 6 successively stores image data which is output from the image number adjusting circuit 5. When data for five pixels is stored, the memory 6 begins to output data to the display 9. The address of the memory 6 which has completed output to the display 9 need no longer hold the data and accordingly, after storing data for 10 pixels, overwriting is performed. When writing QVGA video data into the memory 6 by reducing the number of pixels to 3/5, the average write cycle is 267 n seconds, while the read out cycle into the display 9 is 271 n seconds. Accordingly, data is written into memory 6 4 n seconds faster for each pixel. When the display has 557 pixels, i.e., when there are 186 pixels for each of the RGB colors, writing into the memory 6 precedes by 4 n seconds× 186 pixels=744 n seconds while displaying one line. Because about three pixels are written into the memory during this period, it is possible to begin reading out at the fifth pixel of the 10-pixel memory 6, leaving five pixels in reserve. During operation of one line, the write address into the memory 6 catches up with the read out address and there is no danger of data overwrite on data which has not yet been read out.

The memory 6 may have capacity of 8 pixels. Therefore, the operation can be completed successfully if reading out is started after writing of the fourth pixel. However, as has been described above, various standards are possible for the video data and for the display 9. When a 10-pixel memory is provided, it is possible to cope with all combinations of current data standards and display standards. Although in the earlier example writing into the memory precedes reading out to the display, because in this embodiment writing into the memory 6 precedes reading out by five pixels, the device can handle situations wherein the writing into the memory is later than the reading out to the display without modifying the circuit structure.

Of course, as the capacity of the memory 6 increases, the number of combinations of patterns of standards which can be handled can be increased. However, because when the capacity of the memory 6 is increased, the circuit size is also increased, it is preferable to have a capacity not greater than 50 pixels and to minimize the capacity in accordance with the estimated standard combinations. Accordingly, the aforementioned 10-pixel capacity is considered to be optimal, in consideration of operation stability and circuit size.

The memory 6 of the present embodiment can be used not only when the video data and the display have different numbers of pixels but also when they have an identical number of pixels. When the video data which is input and the display have identical standards, identical clocks are generally used for the video data and the display but these two clocks are not always synchronized. Accordingly, for example, if the input video data change point overlaps the display sampling timing, a correct display cannot be produced. In comparison, when the video data is temporarily stored in the memory 6 along with its clock and is read out with the sampling clock of the display so as to be displayed, a display can be reliably produced even if the two clocks are not synchronized.

Also, although in the example illustrating the above embodiment 8 bit digital video data was described, the present invention is not limited to such a data format, as should be obvious to anyone in the art.

As has been described above, according to the present invention, a digital video signal is processed as digital data without being converted into an analog signal before the display 9 and is converted into a voltage signal immediately before the display 9 (output of the DSP 7) which is amplified by the amplifier 8. Accordingly, an ASP 103 having a bipolar transistor need not be provided. This can reduce the time required for circuit design, increase the structure ratio of the digital circuit constituted by an MOS transistor, and reduce power consumption.

Moreover, the present invention may employ a display apparatus in which digital video data having a first number of pixels is input with a first cycle and the digital video data is converted into a second number of pixels which is different from the first number of pixels, so as to be displayed with a second cycle, and a pixel number adjusting circuit in which two adjacent data of video data are weighted in accordance with a difference between the first and the second cycle timing, so as to create new data. Accordingly, it is possible to minimize video data image deterioration. Display quality is especially markedly improved compared to display of data by thinning of video data.

Furthermore, because different weights are used for odd-number lines and even-number lines, it is possible to realize a high display quality even when the display apparatus employs delta arrangement.

Moreover, by selecting one of a plurality of preset coefficients, thereby multiplying video data which is input as a first multiplication, and multiplying video data immediately before or after the video data which is input by (1−coefficient) as a second multiplication, and by adding the first and second multiplication result so as to create new video data, it is possible to easily realize a circuit structure.

Moreover, when there is provided a display control circuit having a pixel number adjusting circuit including a selector for selecting one of a plurality of coefficients which have been set in advance; a first multiplier for multiplying video data which is input, by the coefficient; a second multiplier for multiplying video data immediately before or after the video data which is input, by (1−coefficient); and an adder for adding the first multiplication result with the second multiplication result, the present invention can easily be implemented in conjunction with an ordinary display apparatus.

What is claimed is:

1. A display control circuit for converting input digital video data, which is input with a first cycle and has a first number of pixels, into output digital video data having a second number of pixels and a second cycle so as to be displayed, said circuit comprising:
    a selector for selecting one among a plurality of preset coefficients no greater than 1;
    a first multiplier circuit for multiplying input video data by the selected coefficient;
    a second multiplier circuit for multiplying input video data of one pixel adjacent to the input digital video data of the one pixel by (1−the coefficient); and
    an adder circuit for adding an output of the first multiplier circuit with an output of the second multiplier circuit, wherein the adder circuit outputs output digital video data;
    the output digital video signal is a signal supplied to a display apparatus employing a delta arrangement in which pixels of the same color are offset-arranged in each line, and
    the pixel number adjusting circuit modifies the weight for the odd-number lines and the even-number lines.

2. A display control circuit for converting input digital video data, which is input with a first cycle and has a first number of pixels, into output digital video data having a second number of pixels and a second cycle so as to be displayed, said circuit comprising:
    a selector for selecting one among a plurality of preset coefficients no greater than 1;
    a first multiplier circuit for multiplying input video data by the selected coefficient;
    a second multiplier circuit for multiplying input video data of one pixel adjacent to the input digital video data of the one pixel by (1−the coefficient); and
    an adder circuit for adding an output of the first multiplier circuit with an output of the second multiplier circuit, wherein the adder circuit outputs output digital video data;
    a memory for temporarily storing the output digital video data, wherein
    data is written into this memory with a write-in clock whose rising and falling timings are in synchronism with those of the clock in the first cycle and whose frequency matches with that of the clock in the second cycle, and
    output digital video data is read out from this memory with the second cycle;
    wherein, when there is no empty area for storing output digital video data, old data is successively overwritten by the output digital video data;
    wherein the memory has a capacity no greater than 50 pixels of output video data; and
    wherein the memory has a capacity for storing 10 pixels of the output video data and, when data of 5 pixels is stored, reading out is started beginning with older data.

3. A display apparatus for converting input digital video data, which is input with a first cycle and has a first number of pixels, into output digital video data having a second number of pixels and a second cycle so as to be displayed, said apparatus comprising:
    a selector circuit for selecting one of a plurality of preset coefficients no greater than 1;
    a first multiplier circuit for multiplying input video data by the selected coefficient;
    a second multiplier circuit for multiplying input video data of one pixel adjacent to the input digital video data of the one pixel by (1−the coefficient); and
    an adder circuit for adding an output of the first multiplier circuit with an output of the second multiplier circuit, wherein output digital video data is obtained as an output of the adder circuit and display is performed in accordance with this output digital video data;

wherein said display apparatus employs a delta arrangement in which pixels of identical colors are offset-arranged in each line; and the selector circuit includes a first coefficient selector for odd-number lines; a second coefficient selector for even-number lines; and a selector for switching between the first coefficient selector and the second coefficient selector.

4. A display apparatus for converting input digital video data, which is input with a first cycle and has a first number of pixels, into output digital video data having a second number of pixels and a second cycle so as to be displayed, said apparatus comprising:

a selector circuit for selecting one of a plurality of preset coefficients no greater than 1;

a first multiplier circuit for multiplying input video data by the selected coefficient;

a second multiplier circuit for multiplying input video data of one pixel adjacent to the input digital video data of the one pixel by (1−the coefficient); and an adder circuit for adding an output of the first multiplier circuit with an output of the second multiplier circuit, wherein output digital video data is obtained as an output of the adder circuit and display is performed in accordance with this output digital video data;

wherein, when there is no empty area for storing output digital video data, old data is successively overwritten by the output digital video data;

wherein the memory has a capacity no greater than 50 pixels of output video data; and wherein the memory has a capacity for storing 10 pixels of the output video data and when data of 5 pixels is stored, reading out is started beginning with older data.

5. A display control circuit for converting input digital video data, which is input with a first cycle and has a first number of pixels, into an output digital video data having a second number of pixels and a second cycle, said circuit comprising:

a memory for storing the input digital video data which is input with the first cycle; and a read-out circuit for reading out output digital video data from this memory with the second cycle, wherein the memory has a capacity no greater than 50 pixels of output video data;

wherein data is written into this memory with a write-in clock whose rising and falling timings are in synchronism with those of the clock in the first cycle and whose frequency matches with that of the clock in the second cycle, and output digital video data is successively read out from this memory with the second cycle;

wherein when there is no empty area for storing output digital video data, old data is successively overwritten by the output digital video data; and wherein the memory has a capacity for storing 10 pixels of the output video data, and when data of 5 pixels is stored, reading out is started beginning with older data.

6. A display apparatus for converting input digital video data, which is input with a first cycle and has a first number of pixels, into an output digital video data having a second number of pixels and a second cycle, said apparatus comprising:

a memory for storing the input digital video data which is input with the first cycle; and a read-out circuit for reading out output digital video data from this memory with the second cycle, wherein the memory has a capacity no greater than 50 pixels of output video data;

wherein data is written into this memory with a write-in clock whose rising and falling timings are in synchronism with those of the clock in the first cycle and whose frequency matches with that of the clock in the second cycle, and output digital video data is successively read out from this memory with the second cycle;

wherein, when there is no empty area for storing output digital video data, old data is successively overwritten by the output digital video data; and wherein the memory has a capacity for storing 10 pixels of the output video data, and when data of 5 pixels is stored, reading out is started beginning with older data.

* * * * *